United States Patent
Peng et al.

(10) Patent No.: US 9,568,989 B2
(45) Date of Patent: Feb. 14, 2017

(54) METHOD FOR ACTING AS SERVICE AGENT, MODEM, AND TERMINAL BY ESTABLISHING A HEARTBEAT CONNECTION WITH AN APPLICATION SERVER

(71) Applicant: Huawei Device Co., Ltd., Shenzhen (CN)

(72) Inventors: Yu Peng, Shanghai (CN); Yu Deng, Shanghai (CN); Qilin Li, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 221 days.

(21) Appl. No.: 14/523,631

(22) Filed: Oct. 24, 2014

(65) Prior Publication Data

US 2015/0121100 A1    Apr. 30, 2015

Related U.S. Application Data

(63) Continuation of application No. PCT/CN2013/086120, filed on Oct. 29, 2013.

(51) Int. Cl.
    *G06F 1/32*    (2006.01)
    *H04W 52/02*    (2009.01)
    (Continued)

(52) U.S. Cl.
    CPC ........... *G06F 1/3293* (2013.01); *H04L 43/103* (2013.01); *H04L 67/145* (2013.01);
    (Continued)

(58) Field of Classification Search
    CPC .................................................... G06F 1/3293
    See application file for complete search history.

(56) References Cited

U.S. PATENT DOCUMENTS

| 8,010,821 B2 * | 8/2011 | Edwards | G06F 1/3209 |
| | | | 713/320 |
| 8,310,969 B2 * | 11/2012 | Tsai | H04M 1/73 |
| | | | 370/310 |

(Continued)

FOREIGN PATENT DOCUMENTS

| CN | 102523178 A | 6/2012 |
| CN | 103079285 A | 5/2013 |

(Continued)

*Primary Examiner* — Nitin Patel
(74) *Attorney, Agent, or Firm* — Slater Matsil, LLP

(57) ABSTRACT

The present invention discloses a method for acting as a service agent, including: receiving, by a modem, heartbeat configuration information corresponding to an application and sent by an application processor, where the application processor is in a sleep state after sending the heartbeat configuration information corresponding to the application, and establishing, by the modem according to the heartbeat configuration information corresponding to the application, a heartbeat connection with an application server corresponding to the application, so that the application processor is not woken up when the application has no updated content. Solutions provided by embodiments of the present invention can prevent an AP from being frequently woken up, thereby lowering power consumption of a terminal and extending standby time of the terminal.

21 Claims, 9 Drawing Sheets

(51) Int. Cl.
*H04L 29/08* (2006.01)
*H04L 12/26* (2006.01)

(52) U.S. Cl.
CPC ....... *H04W 52/0229* (2013.01); *Y02B 60/121* (2013.01); *Y02B 60/46* (2013.01); *Y02B 60/50* (2013.01)

(56) References Cited

U.S. PATENT DOCUMENTS

| | | | |
|---|---|---|---|
| 8,364,857 B2 * | 1/2013 | Pyers | G06F 1/3203 455/556.2 |
| 2010/0069127 A1 | 3/2010 | Fiennes | |
| 2012/0117401 A1 | 5/2012 | Gobriel et al. | |
| 2012/0188928 A1 | 7/2012 | Wang et al. | |
| 2014/0143575 A1 * | 5/2014 | Ansley | H04W 52/0235 713/323 |

FOREIGN PATENT DOCUMENTS

| | | |
|---|---|---|
| CN | 103118188 A | 5/2013 |
| CN | 103369001 A | 10/2013 |

* cited by examiner

_US 9,568,989 B2_

METHOD FOR ACTING AS SERVICE AGENT, MODEM, AND TERMINAL BY ESTABLISHING A HEARTBEAT CONNECTION WITH AN APPLICATION SERVER

This application is a continuation of International Application PCT/CN2013/086120, filed on Oct. 29, 2013, which is hereby incorporated by reference in its entirety.

TECHNICAL FIELD

The present invention relates to the field of communications technologies, and in particular, to a method for acting as a service agent, a modem, and a terminal.

BACKGROUND

At present, most terminals include an application processor (AP) and a modem (Modem). A modem is responsible for communicating with a network, receiving a packet from a network and then forwarding the packet to an AP, or sending a packet sent from an AP to an air interface.

In a state in which a terminal is connected to a data service, some applications or services of an AP, such as email, WeChat, QQ, and microblog, regularly interact with corresponding application servers, and the AP will be woken up if the AP is in a sleep state at this time.

In the prior art, when an application in a terminal and a corresponding application server establish a heartbeat connection, both a modem and an application processor on the terminal are woken up, so as to complete a heartbeat task together. When different applications and corresponding application servers establish heartbeat connections, the application processor is frequently woken up, resulting in high power consumption of the terminal and shortening standby time of the terminal.

SUMMARY

Embodiments of the present invention provide a method for acting as a service agent, where a modem acts as an agent of an application processor to establish a heartbeat connection with an application server corresponding to an application, so as to prevent the AP from being frequently woken up, thereby lowering power consumption of a terminal and extending standby time of the terminal. The embodiments of the present invention further provide a corresponding modem and terminal.

A first aspect of the present invention provides a method for acting as a service agent, including receiving, by a modem, heartbeat configuration information corresponding to an application and sent by an application processor. The application processor is in a sleep state after sending the heartbeat configuration information corresponding to the application. The method further includes establishing, by the modem according to the heartbeat configuration information corresponding to the application, a heartbeat connection with an application server corresponding to the application so that the application processor is not woken up when the application has no updated content.

With reference to the first aspect, in a first possible implementation manner, the heartbeat configuration information includes an initial heartbeat interval of the application.

With reference to the first possible implementation manner of the first aspect, in a second possible implementation manner, when the application includes at least two applications, the establishing, by the modem according to the heartbeat configuration information corresponding to the application, a heartbeat connection with an application server corresponding to the application includes comparing, by the modem, initial heartbeat intervals of the at least two applications with a preset time threshold. When an initial heartbeat interval of one application of the at least two applications is not less than the preset time threshold, the initial heartbeat interval of the one application of the at least two applications is adjusted. A heartbeat connection with an application server corresponding to the one application of the at least two applications is established according to an adjusted initial heartbeat interval.

With reference to the second possible implementation manner of the first aspect, in a third possible implementation manner, when an initial heartbeat interval of one application of the at least two applications are less than the preset time threshold, the initial heartbeat interval of the applications is not adjusted.

With reference to the second possible implementation manner of the first aspect, in a fourth possible implementation manner, the when an initial heartbeat interval of one application of the at least two applications is not less than the preset time threshold, adjusting the initial heartbeat interval of the one application of the at least two applications includes determining a minimum initial heartbeat interval according to the initial heartbeat intervals of the at least two applications. The method further includes dividing the initial heartbeat interval, which is not less than the preset time threshold, of the one application of the at least two applications by the minimum initial heartbeat interval and rounding up or down a quotient to obtain a whole number, and multiplying the whole number by the minimum initial heartbeat interval, to determine an adjusted heartbeat interval for the one application of the at least two applications. The initial heartbeat interval of the one application of the at least two applications is adjusted according to the adjusted heartbeat interval for the one application of the at least two applications.

With reference to the first aspect, in a fifth possible implementation manner, the establishing, by the modem according to the heartbeat configuration information corresponding to the application, a heartbeat connection with an application server corresponding to the application includes establishing, according to the heartbeat configuration information corresponding to the application, the heartbeat connection with the application server corresponding to the application by sending an online indication message to the application server corresponding to the application.

With reference to any one of the first aspect and the first to fifth possible implementation manners of the first aspect, in a sixth possible implementation manner, the modem communicates with the application processor by using a shared memory (SM) or an AT instruction channel.

With reference to the fifth possible implementation manner of the first aspect, in a seventh possible implementation manner, after the sending an online indication message to the application server corresponding to the application, the method further includes receiving, by the modem, data sent by the application server, analyzing, by the modem, whether the data sent by the application server is application data according to the received data sent by the application server. The method includes executing at least one or more of the following steps according to an analysis result. When it is learned, by analyzing, that the data is application data is normally pushed by the application server, the application processor is waken up and the application data is sent to the application processor. When it is learned, by analyzing, that the data is abnormal response data fed back by the application server with regard to the online indication message, the application processor is waken up and the abnormal response data is sent to the application processor. The abnormal response data is interaction data fed back by the application server to the application processor. When it is learned, by analyzing, that the data is normal response data fed back by the application server with regard to the online indication message, the normal response data is discarded and waking up the application processor is skipped. The normal response data is used for indicating that the application server has already received the online indication message.

With reference to any one of the first aspect and the first to seventh possible implementation manners of the first aspect, in an eighth possible implementation manner, after the receiving, by a modem, heartbeat configuration information corresponding to an application and sent by an application processor. The method further includes receiving, by the modem, deletion instruction information, which is sent by the application processor, for the heartbeat configuration information corresponding to the application. The deletion instruction information is used for instructing deletion of the heartbeat configuration information of the application specified by the application processor. The method further includes deleting, by the modem according to the received deletion instruction information, the heartbeat configuration information of the application specified by the application processor.

A second aspect of the present invention provides a modem, including: an input device, an output device, a processor, and a memory. The input device is configured to receive heartbeat configuration information corresponding to an application and sent by an application processor. The application processor is in a sleep state after sending the heartbeat configuration information corresponding to the application. The processor is configured to establish, according to the heartbeat configuration information corresponding to the application, a heartbeat connection with an application server corresponding to the application, so that the application processor is not woken up when the application has no updated content.

With reference to the second aspect, in a first possible implementation manner, the heartbeat configuration information includes an initial heartbeat interval of the application. The processor is configured to compare initial heartbeat intervals of the at least two applications with a preset time threshold when the application includes at least two applications. When an initial heartbeat interval of one application of the at least two applications is not less than the preset time threshold, the initial heartbeat interval of the one application of the at least two applications is adjusted, and a heartbeat connection is established, according to an adjusted initial heartbeat interval, with an application server corresponding to the one application of the at least two applications.

With reference to the first possible implementation manner of the second aspect, in a second possible implementation manner, the processor is configured to: determine a minimum initial heartbeat interval according to the initial heartbeat intervals of the at least two applications; divide the initial heartbeat interval, which is not less than the preset time threshold, of the one application of the at least two applications by the minimum initial heartbeat interval and rounding up or down a quotient to obtain a whole number; multiply the whole number by the minimum initial heartbeat interval to determine an adjusted heartbeat interval for the one application of the at least two applications; and adjust the initial heartbeat interval of the one application of the at least two applications according to the adjusted heartbeat interval for the one application of the at least two applications.

With reference to the second aspect or the first or second possible implementation manner of the second aspect, in a third possible implementation manner, the processor is configured to trigger, according to the heartbeat configuration information corresponding to the application, sending of an online indication message to the application server corresponding to the application. The output device is configured to send the online indication message to the application server corresponding to the application, so as to establish the heartbeat connection with the application server corresponding to the application.

With reference to the third possible implementation manner of the second aspect, in a fourth possible implementation manner. The input device is further configured to receive data sent by the application server. The processor is further configured to analyze whether the data sent by the application server is application data according to the received data sent by the application server. The processor and the output device are further configured to execute at least one or more of the following steps according to an analysis result. When the processor learns, by analyzing, that the data is application data is normally pushed by the application server, the processor wakes up the application processor, and the output device sends the application data to the application processor. When the processor learns, by analyzing, that the data is abnormal response data fed back by the application server with regard to the online indication message, the processor wakes up the application processor, and the output device sends the abnormal response data to the application processor. The abnormal response data is interaction data fed back by the application server to the application processor. When the processor learns, by analyzing, that the data is normal response data fed back by the application server with regard to the online indication message, the processor discards the normal response data and skips waking up the application processor, where the normal response data is used for indicating that the application server has already received the online indication message.

With reference to any one of the second aspect and the first to fourth possible implementation manners of the second aspect, in a fifth possible implementation manner, the input device is further configured to receive deletion instruction information, which is sent by the application processor, for the heartbeat configuration information corresponding to the application, where the deletion instruction information is used for instructing deletion of the heartbeat configuration information of the application specified by the application processor. The processor is further configured to delete, according to the received deletion instruction information, the heartbeat configuration information of the application specified by the application processor.

A third aspect of the present invention provides a terminal, including: a modem and an application processor, where the application processor is configured to send heartbeat configuration information corresponding to an application to the modem, and is in a sleep state after sending the heartbeat configuration information corresponding to the application, and the application processor is not woken up when the application has no updated content. The modem is configured to receive the heartbeat configuration information corresponding to the application and sent by the application processor, and establish, according to the heartbeat configuration information corresponding to the application, a heartbeat connection with an application server corresponding to the application.

With reference to the third aspect, in a first possible implementation manner, when the application includes at least two applications, the modem is further configured to: compare initial heartbeat intervals of the at least two applications with a preset time threshold; and when an initial heartbeat interval of one application of the at least two applications is not less than the preset time threshold, adjust the initial heartbeat interval of the one application of the at least two applications, and establish, according to an adjusted initial heartbeat interval, a heartbeat connection with an application server corresponding to the one application of the at least two applications.

With reference to the first possible implementation manner of the third aspect, in a second possible implementation manner, the modem is further configured to: determine a minimum initial heartbeat interval according to the initial heartbeat intervals of the at least two applications; divide the initial heartbeat interval, which is not less than the preset time threshold, of the one application of the at least two applications by the minimum initial heartbeat interval and rounding up or down a quotient to obtain a whole number; multiply the whole number by the minimum initial heartbeat interval to determine an adjusted heartbeat interval for the one application of the at least two applications; and adjust the initial heartbeat interval of the one application of the at least two applications according to the adjusted heartbeat interval for the one application of the at least two applications.

With reference to the third aspect or the first or second possible implementation manner of the third aspect, in a third possible implementation manner, the modem is further configured to establish, according to the heartbeat configuration information corresponding to the application, the heartbeat connection with the application server corresponding to the application by sending an online indication message to the application server corresponding to the application.

With reference to the third possible implementation manner of the third aspect, in a fourth possible implementation manner, the modem is further configured to receive data sent by the application server after sending the online indication message to the application server corresponding to the application, and analyze whether the data sent by the application server is application data according to the received data sent by the application server. The modem is further configured to execute at least one or more of the following steps according to an analysis result. When it is learned, by analyzing, that the data is application data normally pushed by the application server, the application processor is waken up and the application data is sent to the application processor. When it is learned, by analyzing, that the data is abnormal response data fed back by the application server with regard to the online indication message, the application processor is waken up and the abnormal response data is sent to the application processor, where the abnormal response data is interaction data fed back by the application server to the application processor. When it is learned, by analyzing, that the data is normal response data fed back by the application server with regard to the online indication message, the normal response data is discarded and waking up the application processor is skipped, where the normal response data is used for indicating that the application server has already received the online indication message.

With reference to any one of the third aspect and the first to fourth possible implementation manners of the third aspect, in a fifth possible implementation manner, the modem is further configured to receive deletion instruction information, which is sent by the application processor, for the heartbeat configuration information corresponding to the application after receiving the heartbeat configuration information corresponding to the application and sent by the application processor. The deletion instruction information is used for instructing deletion of the heartbeat configuration information of the application specified by the application processor. The modem is further configured to delete, according to the received deletion instruction information, the heartbeat configuration information of the application specified by the application processor.

In the embodiments of the present invention, after receiving heartbeat configuration information corresponding to an application and sent by an application processor, a modem acts as an agent of the application processor to establish a heartbeat connection with an application server corresponding to the application, so that the application processor is not woken up when the application has no updated content. Compared with the prior art in which an AP is woken up each time the application processor establishes a heartbeat connection with an application server corresponding to an application, solutions provided by the embodiments of the present invention can prevent an AP from being frequently woken up, thereby lowering power consumption of a terminal and extending standby time of the terminal.

BRIEF DESCRIPTION OF THE DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION OF ILLUSTRATIVE EMBODIMENTS

Embodiments of the present invention provide a method for acting as a service agent, where a modem acts as an agent of an application processor to establish a heartbeat connection with an application server corresponding to an application, so as to prevent the application processor (Application Processor, AP) from being frequently woken up, thereby lowering power consumption of a terminal and extending standby time of the terminal. The embodiments of the present invention further provide a corresponding modem and terminal. The embodiments are separately described in detail in the following.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

Figure 1:
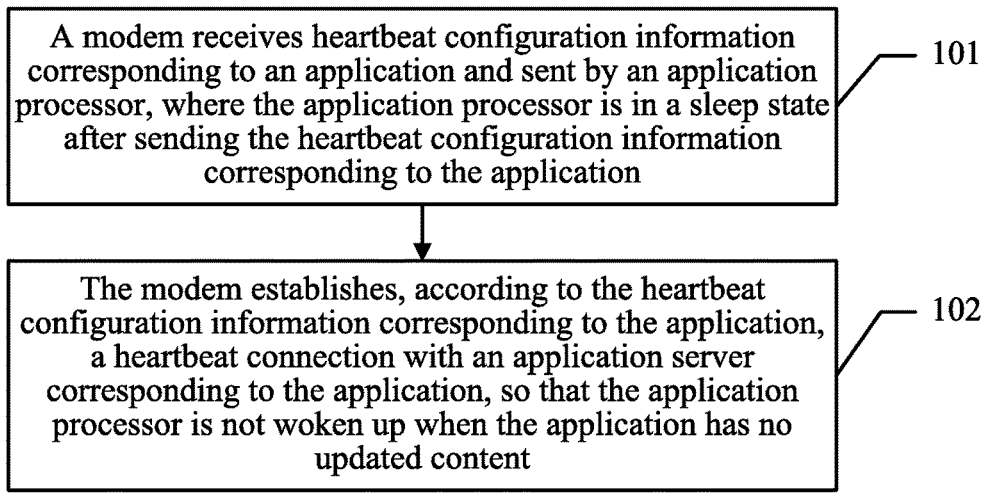
FIG. 1 is a schematic diagram of an embodiment of a method for acting as a service agent according to the present invention.

Referring to FIG. 1, a method for acting as a service agent provided by an embodiment of the present invention includes:

101: A modem receives heartbeat configuration information corresponding to an application and sent by an application processor, where the application processor is in a sleep state after sending the heartbeat configuration information corresponding to the application.

The heartbeat configuration information includes an initial heartbeat interval of the application.

The initial heartbeat interval of the application is a period at which the application processor establishes a heartbeat connection with an application server of the application, that is, how often the application processor establishes a heartbeat connection with the application server of the application. The heartbeat configuration information may be obtained by the application processor from the application server corresponding to the application.

The modem communicates with the application processor by using a shared memory (SM) or an attention (AT) instruction channel.

The application in the embodiment of the present invention may be an application involved in the prior art, such as WeChat, microblog, or email.

102: The modem establishes, according to the heartbeat configuration information corresponding to the application, a heartbeat connection with an application server corresponding to the application, so that the application processor is not woken up when the application has no updated content.

The application server and the application processor determine whether the application is in a connected state by using the heartbeat connection.

In the embodiment of the present invention, after receiving heartbeat configuration information corresponding to an application and sent by an application processor, a modem acts as an agent of the application processor to establish a heartbeat connection with an application server corresponding to the application, so that the application processor is not woken up when the application has no updated content. Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal.

Figure 2:
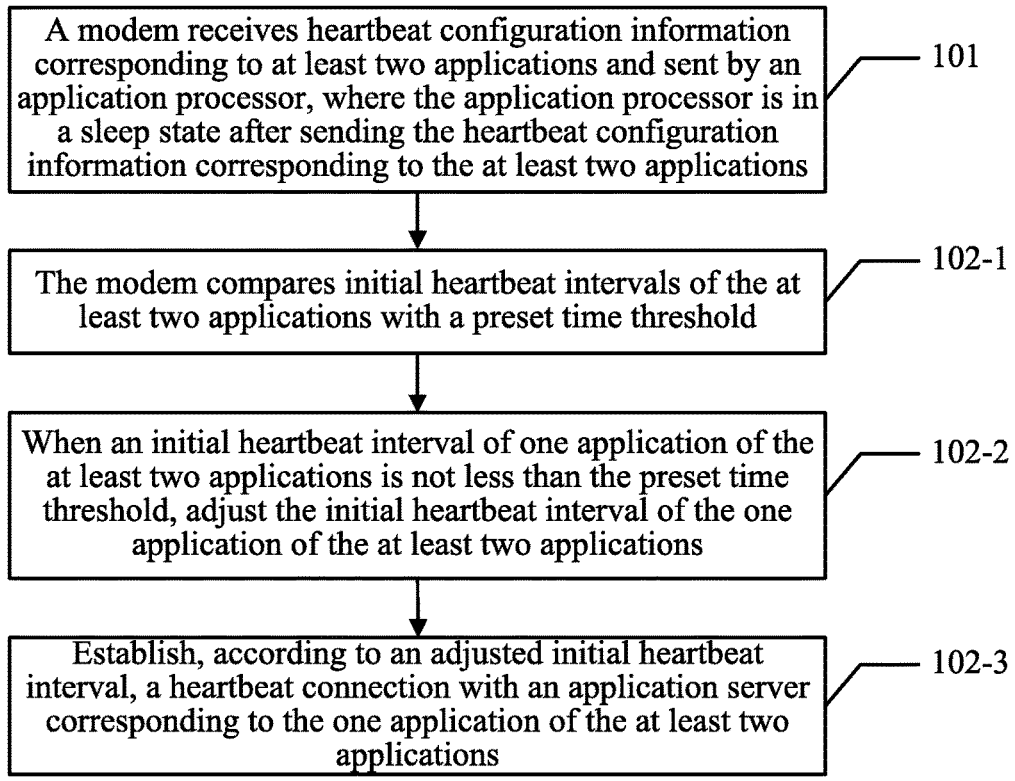
FIG. 2 is a schematic diagram of another embodiment of the method for acting as a service agent according to the present invention.

Optionally, referring to FIG. 2, FIG. 2 is a schematic diagram of another embodiment of the method for acting as a service agent according to the present invention. Another embodiment of the method for acting as a service agent includes steps 101 and 102, where when the application includes at least two applications, step 102 may specifically include: 102-1, 102-2, and 102-3.

To help understand steps 101 and 102, reference may be made to the related descriptions of steps 101 and 102 in the embodiment corresponding to FIG. 1, which are not described herein again.

Steps 102-1, 102-2, and 102-3 may specifically be described as follows:

102-1: The modem compares initial heartbeat intervals of the at least two applications with a preset time threshold.

The preset time threshold may be set by the application processor.

Assume that there are three applications, initial heartbeat intervals of the three applications are 5 minutes, 7 minutes, and 10 minutes, and a preset time threshold is 6 minutes, the initial heartbeat intervals of the 3 applications, which are 5 minutes, 7 minutes, and 10 minutes, are separately compared with 6 minutes.

102-2: When an initial heartbeat interval of one application of the at least two applications is not less than the preset time threshold, adjust the initial heartbeat interval of the one application of the at least two applications.

In the example in step 102-1, the initial heartbeat intervals of 7 minutes and 10 minutes are not less than the preset time threshold of 6 minutes; therefore, the initial heartbeat intervals of 7 minutes and 10 minutes need to be adjusted.

102-3: Establish, according to an adjusted initial heartbeat interval, a heartbeat connection with an application server corresponding to the one application of the at least two applications.

In the example in step 102-2, the initial heartbeat intervals of 7 minutes and 10 minutes need to be adjusted; therefore, heartbeat connections with application servers corresponding to the two applications of which the initial heartbeat interval are 7 minutes and 10 minutes are separately established according to the adjusted initial heartbeat interval.

Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal. In addition, an initial heartbeat interval not less than a preset time threshold is adjusted, which can reduce the number of times a modem and an application server perform link establishment. For example, by adjusting both 7 minutes and 10 minutes are to 6 minutes, or adjusting 10 minutes to 7 minutes, link establishment may be performed only once at a time point of with an interval of 6 minutes or 7 minutes, and heartbeat connections with application servers corresponding to applications of which initial heartbeat intervals are 7 minutes and 10 minutes can be separately established, thereby reducing the number of times of link establishment, lowering power consumption of a modem, and further lowering power consumption of a terminal.

Figure 3:
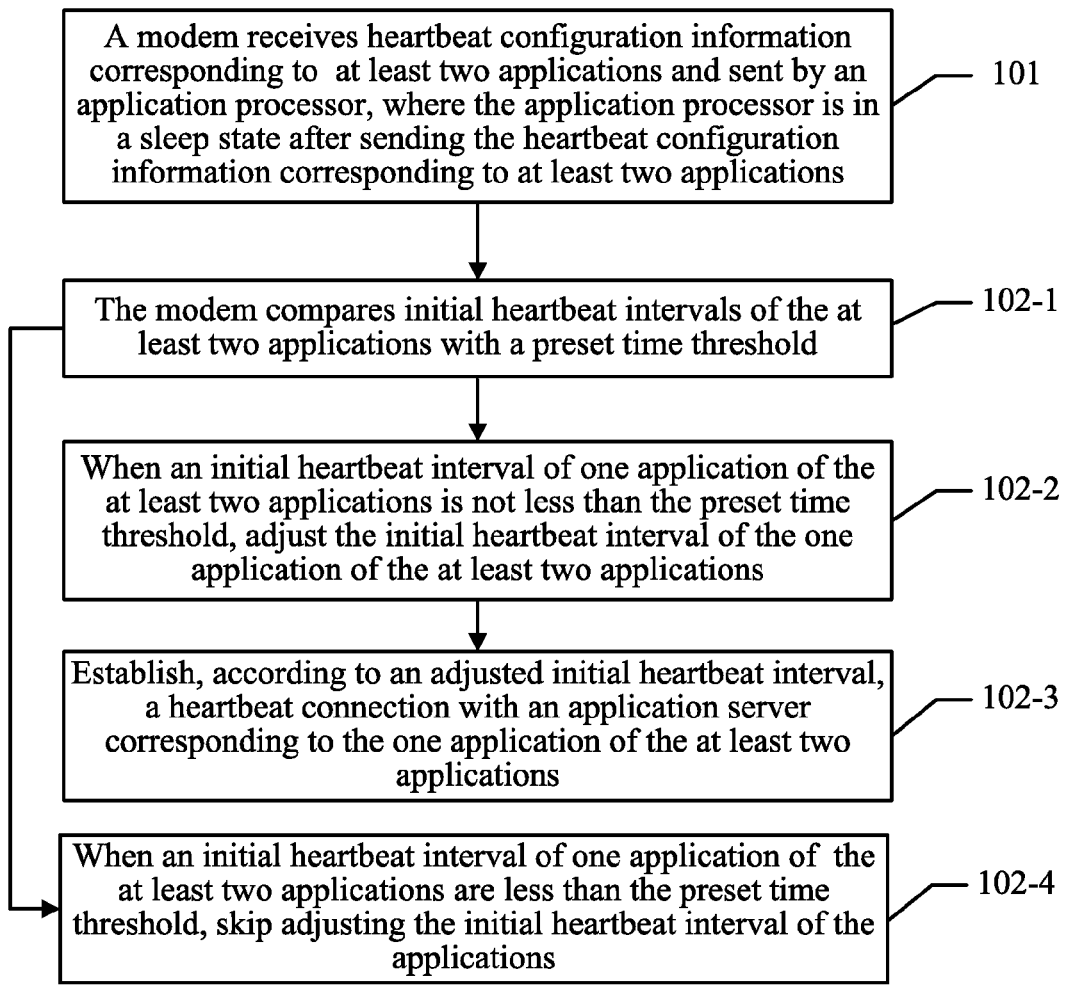
FIG. 3 is a schematic diagram of another embodiment of the method for acting as a service agent according to the present invention.

Optionally, referring to FIG. 3, FIG. 3 is a schematic diagram of another embodiment of the method for acting as a service agent according to the present invention. The another embodiment of the method for acting as a service agent provided by the embodiments of the present invention includes steps 101 and 102, where step 102 specifically includes 102-1, 102-2, 102-3, and 102-4, where steps 102-2 and 102-3 may be executed in order after step 102-1, and step 102-4 may be executed after step 102-1.

To help understand steps 101, 102, 102-1, 102-2, and 102-3, reference may be made to the related descriptions of steps 101, 102, 102-1, 102-2, and 102-3 in the foregoing embodiments, which are not described herein again.

Step 102-4 may specifically be described as follows.

102-4: When an initial heartbeat interval of one application of the at least two applications are less than the preset time threshold, skip adjusting the initial heartbeat interval of the applications.

In the example in step 102-1, the initial heartbeat interval of 5 minutes is less than the preset time threshold of 6 minutes; therefore, the initial heartbeat interval of 5 minutes is not adjusted.

Because an initial heartbeat interval of an application is preset by an application server of the application, if the application server of the application establishes, within the initial heartbeat interval of the application, a heartbeat connection with an application processor on a terminal in which the application is located, it is confirmed that the application is online; if no heartbeat connection is established with an application processor on a terminal in which the application is located within the initial heartbeat interval of the application, the application server of the application takes it by default that the application is offline. Therefore, during adjustment, the initial heartbeat interval of the application can only be shortened and cannot be extended. Therefore, an initial heartbeat interval less than the preset time threshold is not adjusted.

Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal.

Figure 4:
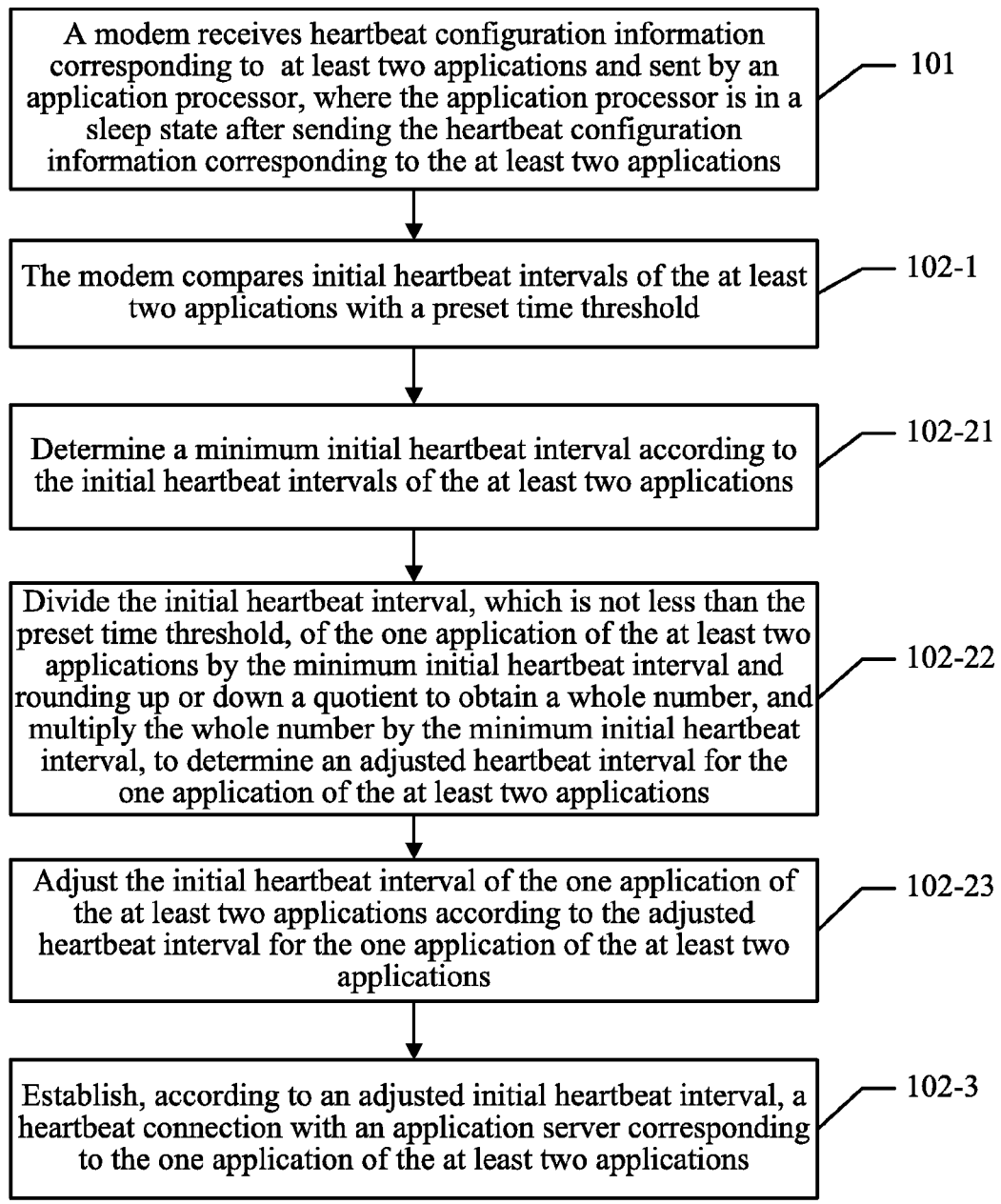
FIG. 4 is a schematic diagram of another embodiment of the method for acting as a service agent according to the present invention.

Optionally, referring to FIG. 4, FIG. 4 is a schematic diagram of another embodiment of the method for acting as a service agent according to the present invention. The another embodiment of the method for acting as a service agent provided by the embodiments of the present invention includes steps 101 and 102, where step 102 specifically includes 102-1, 102-2, and 102-3, where step 102-2 may specifically include 102-21, 102-22, and 102-23.

To help understand steps 101, 102, 102-1, 102-2, and 102-3, reference may be made to the related descriptions of steps 101, 102, 102-1, 102-2, and 102-3 in the foregoing embodiments, which are not described herein again.

Steps 102-21, 102-22, and 102-23 may specifically be described as follows.

102-21: Determine a minimum initial heartbeat interval according to the initial heartbeat intervals of the at least two applications.

For example, when there are four applications of which initial heartbeat intervals are not less than the preset time threshold, assuming that the initial heartbeat intervals of the four applications are 6 minutes, 7 minutes, 10 minutes, and 13 minutes, a minimum initial heartbeat interval is determined from the four initial heartbeat intervals, and in this example, the minimum initial heartbeat interval is 6 minutes.

102-22: Divide the initial heartbeat interval, which is not less than the preset time threshold, of the one application of the at least two applications by the minimum initial heartbeat interval and rounding up or down a quotient to obtain a whole number, and multiply the whole number by the minimum initial heartbeat interval, to determine an adjusted heartbeat interval for the one application of the at least two applications.

The description of this step may be indicated by a formula: $T_{adjusted} = [T_{application}/T_{min}] \times T_{min}$, where $T_{application}$ is an initial heartbeat interval of an application, $T_{min}$ is a minimum initial heartbeat interval, $[T_{application}/T_{min}]$ indicates dividing the initial heartbeat interval of the application by the minimum initial heartbeat interval and rounding up or down a quotient to obtain a whole number, and $[T_{application}/T_{min}] \times T_{min}$ indicates multiplying the whole number by the minimum initial heartbeat interval after obtaining the whole number of $[T_{application}/T_{min}]$.

Continuing with the example in step 102-21, $T_{min}$ is 6 minutes, $T_{adjusted}$=6 minutes is obtained by applying the initial heartbeat interval of 7 minutes to the foregoing formula, $T_{adjusted}$=6 minutes is obtained by applying the initial heartbeat interval of 10 minutes to the foregoing formula, and $T_{adjusted}$=12 minutes is obtained by applying the initial heartbeat interval of 13 minutes to the foregoing formula.

102-23: Adjust the initial heartbeat interval of the one application of the at least two applications according to the adjusted heartbeat interval for the one application of the at least two applications.

Continuing with the example in step 102-22, heartbeat intervals of the last three applications of the four applications are adjusted, and adjusted initial heartbeat intervals for the applications are 6 minutes, 6 minutes, and 12 minutes; therefore, the initial heartbeat intervals of the three applications are adjusted to 6 minutes, 6 minutes, and 12 minutes.

Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal. In addition, an initial heartbeat interval not less than a preset threshold is adjusted, which can reduce the number of times a modem and an application server perform link establishment. For example, by adjusting both 7 minutes and 10 minutes to 6 minutes, and adjusting 13 minutes to 12 minutes, heartbeat connections with application servers corresponding to applications of which initial heartbeat intervals are 6 minutes, 7 minutes and 10 minutes can be separately established when link establishment is performed only once at a time point with an interval of 6 minutes, and heartbeat connections with application servers corresponding to applications of which initial heartbeat intervals are 6 minutes, 7 minutes, 10 minutes, and 13 minutes can be separately established when link establishment is performed once at a time point with an interval of 12 minutes, thereby reducing the number of times of link establishment, lowering power consumption of a modem, and further lowering power consumption of a terminal.

Figure 5:
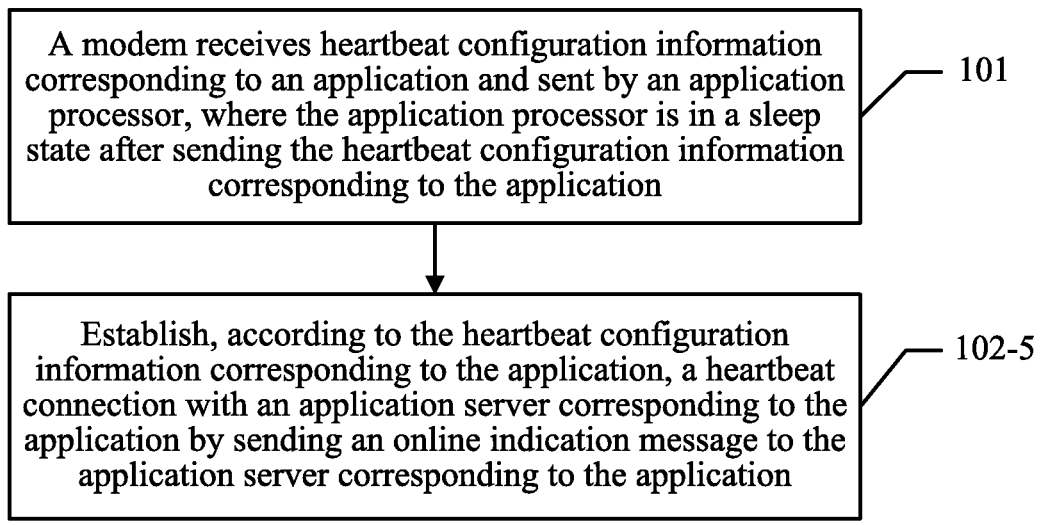
FIG. 5 is a schematic diagram of another embodiment of the method for acting as a service agent according to the present invention.

Referring to FIG. 5, FIG. 5 is a schematic diagram of another embodiment of the method for acting as a service agent according to the present invention. The another embodiment of the method for acting as a service agent provided by the embodiments of the present invention includes steps 101 and 102, where step 102 may specifically be step 102-5.

To help understand steps 101 and 102, reference may be made to the related descriptions of steps 101 and 102 in the embodiment corresponding to FIG. 1, which are not described herein again.

Step 102-5 is specifically described as follows.

102-5: Establish, according to the heartbeat configuration information corresponding to the application, the heartbeat connection with the application server corresponding to the application by sending an online indication message to the application server corresponding to the application.

Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal.

Figure 6:
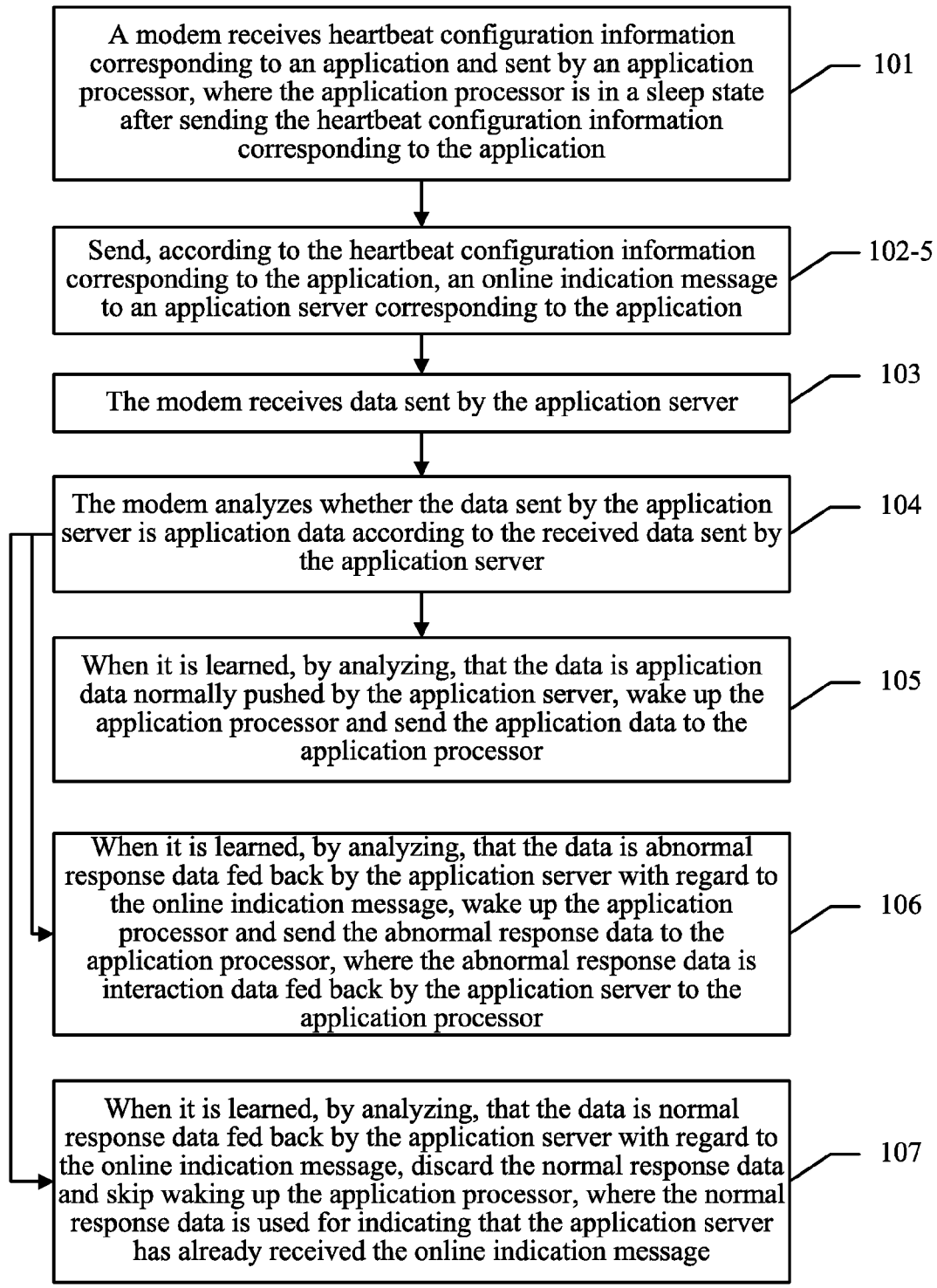
FIG. 6 is a schematic diagram of another embodiment of the method for acting as a service agent according to the present invention.

Optionally, referring to FIG. 6, FIG. 6 is a schematic diagram of another embodiment of the method for acting as a service agent according to the present invention. Another embodiment of the method for acting as a service agent includes steps 101, 102-5, and step 103 to step 107 which are executed after step 102-5.

To help understand steps 101 and 102-5, reference may be made to the related descriptions of steps 101 and 102-5 in the foregoing embodiments, which are not described herein again.

Steps 103 to 107 may specifically be described as follows.

103: The modem receives data sent by the application server.

104: The modem analyzes whether the data sent by the application server is application data according to the received data sent by the application server.

At least one or more of the following steps are executed according to an analysis result:

105: When it is learned, by analyzing, that the data is application data normally pushed by the application server, wake up the application processor and send the application data to the application processor.

Application data normally pushed refers to data which is not sent with regard to an online indication message, and is pushed to a terminal as long as an application server confirms that downward pushing needs to be performed. A modem may determine whether the data is application data according to a period of time required for receiving the data after the online indication message is sent. For example, using 1 minute after the online indication message is sent as a point of demarcation, after the online indication message is sent, data received after 1 minute is considered as normally pushed application data while data received within 1 minute is considered as response data fed back with regard to the online indication message.

Using email as an example, in an automatic pushing scenario, as long as an application server receives an email for an account, the application server pushes the email to a modem of a terminal to which the account is logged in, and the modem needs to wake up an AP and push received application data to the AP.

106: When it is learned, by analyzing, that the data is abnormal response data fed back by the application server with regard to the online indication message, wake up the application processor and send the abnormal response data to the application processor, where the abnormal response data is interaction data fed back by the application server to the application processor.

During analyzing, normal response data and abnormal response data fed back with regard to the online indication message may be distinguished according to the number of bits of the data. For example, using 30 KB as a point of demarcation, data greater than 30 KB is abnormal response data while data less than 30 KB is normal response data.

The abnormal response data may specifically be: interaction data fed back by the application server with regard to the received online indication message. Still using an email application as an example, the abnormal response data may be that there is a new email and specific data content of the email, and the modem may determine, according to the abnormal response data, that the application has updated content, and therefore wake up the application processor.

107: When it is learned, by analyzing, that the data is normal response data fed back by the application server with regard to the online indication message, discard the normal response data, and skip waking up the application processor, where the normal response data is used for indicating that the application server has already received the online indication message.

When the email application is used in the embodiment of the present invention, the normal response data may be that there is no new email at present. The data is meaningless to the application processor, and the modem may directly discard the data without a need to wake up the application processor.

Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal. In addition, when receiving data returned by an application server corresponding to an application, a modem first analyzes the received data, and does not wake up the application processor when no updated content is included in the data, thereby further reducing power consumption of the terminal.

Figure 7:
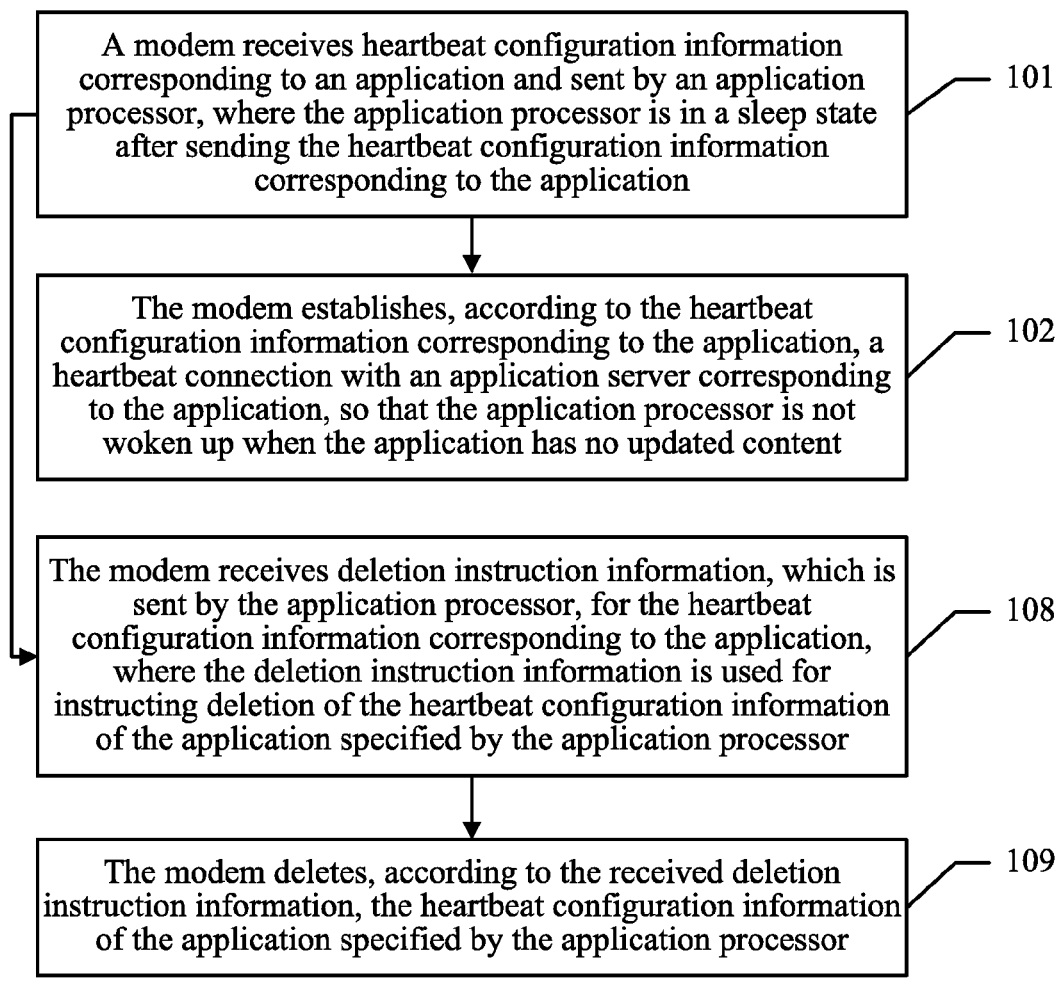
FIG. 7 is a schematic diagram of another embodiment of the method for acting as a service agent according to the present invention.

Optionally, referring to FIG. 7, FIG. 7 is a schematic diagram of another embodiment of the method for acting as a service agent according to the present invention. Another embodiment of the method for acting as a service agent includes steps 101, 102, and steps 108 and 109 which are executed after step 101.

To help understand steps 101 and 102, reference may be made to the related descriptions of steps 101 and 102 in the embodiment corresponding to FIG. 1, which are not described herein again.

Steps 108 and 109 may specifically be described as follows.

108: The modem receives deletion instruction information, which is sent by the application processor, for the heartbeat configuration information corresponding to the application, where the deletion instruction information is used for instructing deletion of the heartbeat configuration information of the application specified by the application processor.

When an installed application is deleted on an AP side, deletion instruction information for heartbeat configuration information may be sent to the modem.

109: The modem deletes, according to the received deletion instruction information, the heartbeat configuration information of the application specified by the application processor.

The modem correspondingly deletes, according to the received deletion instruction information, the already stored heartbeat configuration information of the application specified by the application processor.

Compared with the prior art in which an AP is woken up each time the application processor establishes a heartbeat connection with an application server corresponding to an application, the solution provided by the embodiment of the present invention can prevent an AP from being frequently woken up, thereby lowering power consumption of a terminal and extending standby time of the terminal.

In the embodiment shown in FIG. 7, steps 108 and 109 are further executed after step 101. Actually, steps 108 and 109 may be further executed after step 101 in each of the foregoing embodiments, which will not be illustrated in each of the embodiments of the present invention with drawings. To help understand a specific process, reference may be made to the descriptions of the foregoing steps 108 and 109 in the drawing.

For ease of understanding, the following describes a process of processing an online indication message in an embodiment of the present invention by using several application scenarios as examples.

Figure 8:
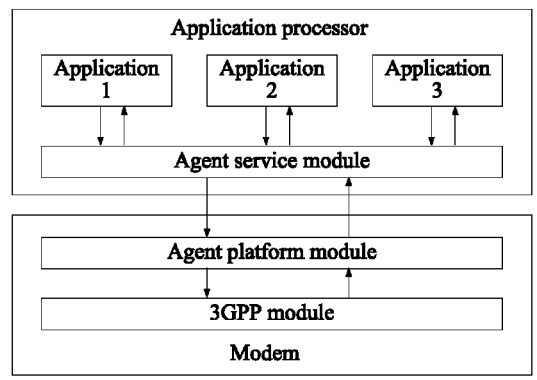
FIG. 8 is a schematic diagram of another embodiment of the method for acting as a service agent according to the present invention.

Referring to FIG. 8, an agent service (Agent Service) module may be set in an application processor AP, and an agent platform (Agent Platform) module may be set in a modem.

As shown in FIG. 8, an Agent Service module is constructed on a framework Framework layer on an AP side, to provide a heartbeat configuration interface for applications (apks), store heartbeat content, and send heartbeat configuration information to the modem. An agent platform processing platform is constructed on a non-access layer in the modem, to receive the heartbeat configuration information, adjust, according to the heartbeat configuration information of the applications, heartbeat intervals for sending online indication messages to application servers corresponding to the applications, so that any heartbeat interval of adjusted heartbeat intervals corresponding to the applications is an integer multiple of a minimum heartbeat interval thereof, and periodically send, according to the adjusted heartbeat intervals, the online indication messages corresponding to the applications to the application servers corresponding to the applications. A protocol used by the present invention for communication between the AP and the modem is a dedicated communications protocol built based on a shared memory (SM) or an attention (AT) instruction channel.

Figure 9:
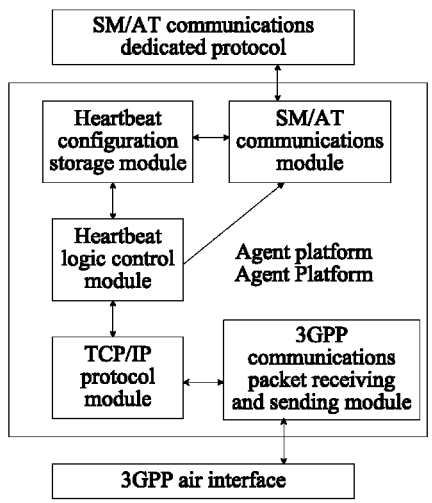
FIG. 9 is a schematic diagram of another embodiment of the method for acting as a service agent according to the present invention.

Referring to FIG. 9, FIG. 9 shows a processing framework of an agent platform.

As a main part for implementing a heartbeat agent, the Agent Platform may be subdivided into a plurality of modules in FIG. 9.

An SM/AT communications module: configured to parse a heartbeat data communications protocol and synchronize heartbeat configuration information, which is sent by an AP, to a storage module; and also responsible for protocol encapsulation of abnormal response data of a server sent from a heartbeat logic control module and invoking an interface to transmit the abnormal response data to the AP.

A heartbeat configuration storage module: configured to store the heartbeat configuration information sent by the AP.

The heartbeat logic control module: configured to perform classification, adjustment, and sorting according to the heartbeat configuration information stored in the storage module, set a corresponding timer, and when preset time arrives, send an online indication message by using an interface of a Transmission Control Protocol/Internet Protocol (TCP/IP) module; and also responsible for analyzing response data of an application server, to determine whether the response data sent by the application server is normal response data and needs to be forwarded to the AP.

The TCP/IP protocol module: configured to encode, according to an encoding manner negotiated with a network side, the online indication message to be sent, where the negotiated encoding manner in the embodiment of the present invention is TCP/IP encoding; and after TCP/IP encoding, assemble data into a format of a point-to-point protocol (PPP) packet which can be transferred on a Long Term Evolution (LTE) wireless link of a 3rd Generation Partnership Project (3GPP).

A 3GPP communications packet receiving and sending module: configured to provide interfaces for sending air interface data and intercepting air interface data.

Figure 10:
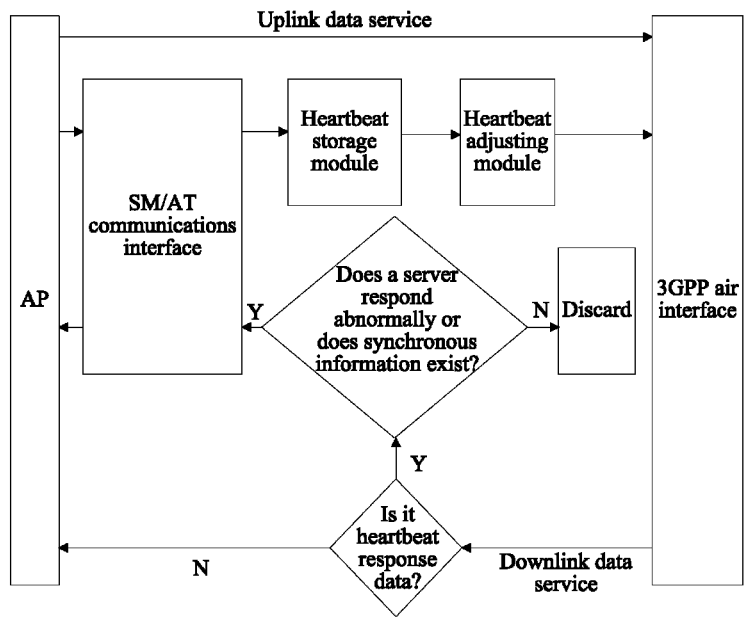
FIG. 10 is a schematic diagram of another embodiment of the method for acting as a service agent according to the present invention.

Referring to FIG. 10, FIG. 10 is a schematic diagram of a processing process of an agent platform agent platform.

In FIG. 10, an AP delivers heartbeat configuration information to a modem through an SM or AT communications interface, a heartbeat storage module stores the heartbeat configuration information, and after adjusting a heartbeat interval, a heartbeat adjusting module acts as an agent of the AP to perform a task of sending an online indication message.

After receiving downlink data sent by an application server, the modem analyzes the downlink data. When it is learned, by analyzing, that the downlink data is data normally pushed by the application server, the modem sends the data, which is normally pushed by the application server, to the AP; when it is learned, by analyzing, that the downlink data is normal response data fed back by the application server with regard to the online indication message, the modem directly discards the data, where the normal response data is used for indicating that the application server has already received the online indication message; and when it is learned, by analyzing, that the data is abnormal response data fed back by the application server for the online indication message, the modem wakes up the application processor, and sends the abnormal response data to the application processor, where the abnormal response data is interaction data fed back by the application server to the application processor.

The present invention further provides a computer storage medium. A program is stored in the medium, and when executed, the program includes a part or all of the steps of the foregoing method for acting as a service agent on a modem side.

Figure 11:
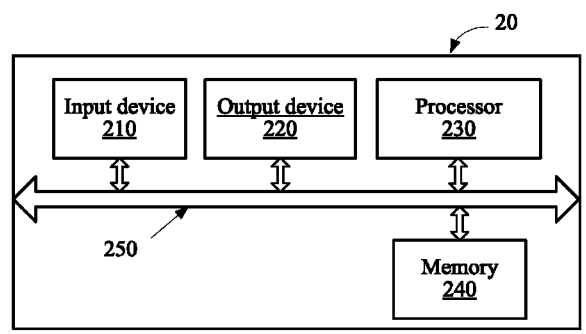
FIG. 11 is a schematic diagram of an embodiment of a modem according to the present invention.

FIG. 11 is a schematic structural diagram of a modem 20 according to an embodiment of the present invention. The modem 20 may include an input device 210, an output device 220, a processor 230, and a memory 240.

The memory 240 may include a read-only memory and a random access memory, and provide an instruction and data for the processor 230. A part of the memory 240 may further include a non-volatile random access memory (NVRAM).

The memory 240 stores the following elements, which include an executable module, or a data structure, or a subset thereof, or an extended set thereof. Operation instructions include various operation instructions and used for implementing various operations. An operating system may include various system programs and used for implementing various basic services and processing a hardware-based task.

In the embodiment of the present invention, the processor 230 executes the following operations by invoking an operation instruction stored in the memory 240 (the operation instruction may be stored in the operating system). The operation instruction enable the processor 230 to receive, by using the input device 210, heartbeat configuration information corresponding to an application and sent by an application processor, where the application processor is in a sleep state after sending the heartbeat configuration information corresponding to the application; and establish, according to the heartbeat configuration information corresponding to the application, a heartbeat connection with an application server corresponding to the application, so that the application processor is not woken up when the application has no updated content.

The modem provided by the embodiment of the present invention can act as an agent of the application server to establish the heartbeat connection with the application server corresponding to the application, so as to prevent the AP from being frequently woken up, thereby lowering power consumption of a terminal and extending standby time of the terminal.

The processor 230 controls an operation of the modem 20, and the processor 230 may further be referred to as a CPU (Central Processing Unit). In a specific application, the components of the modem 20 are coupled together by using a bus system 250, where besides a data bus, the bus system 250 may further include a power supply bus, a control bus, a status signal bus, and the like. However, for clear description, various buses are marked as the bus system 250 in the drawing.

The method disclosed in the foregoing embodiments of the present invention may be applied to the processor 230, or may be implemented by the processor 230. The processor 230 may be an integrated circuit chip that has a signal processing capability. In an implementation process, the steps of the foregoing method may be completed by a hardware integrated logic circuit or an instruction in the form of software in the processor 230. The processor 230 may be a general-purpose processor, a digital signal processor (DSP), an application-specific integrated circuit (ASIC), a field-programmable gate array (FPGA), another programmable logic device, a discrete gate or transistor logic device, or a discrete hardware component. The processor 230 can implement or execute the methods, the steps, and the logical block diagrams disclosed in the embodiments of the present invention. The general-purpose processor may be a microprocessor, or the processor may be any conventional processor. The steps with reference to the methods disclosed in the embodiments of the present invention may be directly executed and completed by a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 240, and the processor 230 reads information in the memory 240, and in conjunction with hardware of the processor 230, implements the steps of the foregoing methods.

Optionally, the heartbeat configuration information includes an initial heartbeat interval of the application.

The processor 230 is configured to: when the application includes at least two applications, compare initial heartbeat intervals of the at least two applications with a preset time threshold; and when an initial heartbeat interval of one application of the at least two applications is not less than the preset time threshold, adjust the initial heartbeat interval of the one application of the at least two applications, and establish, according to an adjusted initial heartbeat interval, a heartbeat connection with an application server corresponding to the one application of the at least two applications.

Optionally, the processor 230 is configured to: determine a minimum initial heartbeat interval according to the initial heartbeat intervals of the at least two applications; divide the initial heartbeat interval, which is not less than the preset time threshold, of the one application of the at least two applications by the minimum initial heartbeat interval and rounding up or down a quotient to obtain a whole number; multiply the whole number by the minimum initial heartbeat interval to determine an adjusted heartbeat interval for the one application of the at least two applications; and adjust the initial heartbeat interval of the one application of the at least two applications according to the adjusted heartbeat interval for the one application of the at least two applications.

Optionally, the processor 230 is configured to trigger, according to the heartbeat configuration information corresponding to the application, sending of an online indication message to the application server corresponding to the application. The output device 220 is configured to send the online indication message to the application server corresponding to the application, to establish the heartbeat connection with the application server corresponding to the application.

Optionally, the input device 210 is further configured to receive data sent by the application server. The processor 230 is further configured to analyze whether the data sent by the application server is application data according to the received data sent by the application server. The processor 230 and the output device 220 are further configured to execute at least one or more of the following steps according to an analysis result. When the processor 230 learns, by analyzing, that the data is application data normally pushed by the application server, the processor 230 wakes up the application processor, and the output device 220 sends the application data to the application processor. When the processor 230 learns, by analyzing, that the data is abnormal response data fed back by the application server with regard to the online indication message, the processor 230 wakes up the application processor, and the output device 220 sends the abnormal response data to the application processor, where the abnormal response data is interaction data fed back by the application server to the application processor. When the processor 230 learns, by analyzing, that the data is normal response data fed back by the application server with regard to the online prompt message, the processor 230 discards the normal response data and skips waking up the application processor. The normal response data is used for indicating that the application server has already received the online indication message.

Optionally, the input device 210 is further configured to receive deletion instruction information, which is sent by the application processor, for the heartbeat configuration information corresponding to the application, where the deletion instruction information is used for instructing deletion of the heartbeat configuration information of the application specified by the application processor. The processor 230 is further configured to delete, according to the received deletion instruction information, the heartbeat configuration information of the application specified by the application processor.

Figure 12:
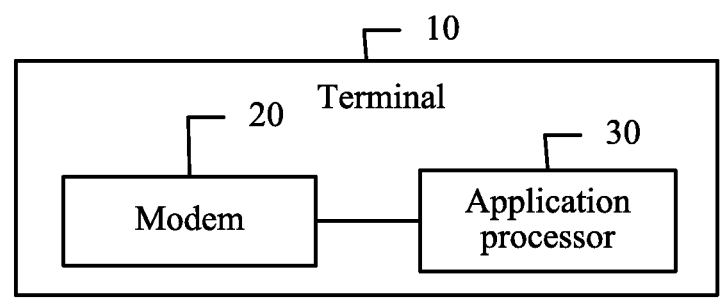
FIG. 12 is a schematic diagram of an embodiment of a terminal according to the present invention.

Referring to FIG. 12, an embodiment of a terminal 10 provided by an embodiment of the present invention includes: a modem 20 and an application processor 30. The application processor 30 sends heartbeat configuration information corresponding to an application to the modem 20, and is in a sleep state after sending the heartbeat configuration information corresponding to the application. The modem 20 receives the heartbeat configuration information corresponding to the application and sent by the application processor, and establishes, according to the heartbeat configuration information corresponding to the application, a heartbeat connection with an application server corresponding to the application. The application processor 30 is not woken up when the application has no updated content.

Optionally, based on the foregoing embodiment corresponding to FIG. 12, in another embodiment of the terminal provided by the embodiment of the present invention, the heartbeat configuration information includes an initial heartbeat interval of the application. When the application includes at least two applications, the modem 20 compares initial heartbeat intervals of the at least two applications with a preset time threshold. When an initial heartbeat interval of one application of the at least two applications is not less than the preset time threshold, the initial heartbeat interval of the one application of the at least two applications is adjusted, and a heartbeat connection is established, according to an adjusted initial heartbeat interval, with an application server corresponding to the one application of the at least two applications.

Optionally, based on the foregoing optional embodiment corresponding to FIG. 12, in another embodiment of the terminal provided by the embodiment of the present invention, the modem 20 determines a minimum initial heartbeat interval according to the initial heartbeat intervals of the at least two applications. The modem 20 divides the initial heartbeat interval, which is not less than the preset time threshold, of the one application of the at least two applications by the minimum initial heartbeat interval and rounding up or down a quotient to obtain a whole number. The modem 20 multiplies the whole number by the minimum initial heartbeat interval to determine an adjusted heartbeat interval for the one application of the at least two applications, and adjusts the initial heartbeat interval of the one application of the at least two applications according to the adjusted heartbeat interval for the one application of the at least two applications.

Based on any one of the foregoing terminal embodiments, in another embodiment of the terminal provided by the embodiment of the present invention, the modem 20 establishes, according to the heartbeat configuration information corresponding to the application, the heartbeat connection with the application server corresponding to the application by sending an online indication message to the application server corresponding to the application.

Based on the foregoing terminal embodiment, in another embodiment of the terminal provided by the embodiment of the present invention, after sending the online indication message to the application server corresponding to the application, the modem 20 receives data sent by the application server; analyzes whether the data sent by the application server is application data according to the received data sent by the application server. The modem 20 executes at least one or more of the following steps according to an analysis result. When it is learned, by analyzing, that the data is application data normally pushed by the application server, the modem 20 wakes up the application processor and sends the application data to the application processor. When it is learned, by analyzing, that the data is abnormal response data fed back by the application server with regard to the online indication message, the modem 20 wakes up the application processor and sends the abnormal response data to the application processor, where the abnormal response data is interaction data fed back by the application server to the application processor. When it is learned, by analyzing, that the data is normal response data fed back by the application server for the online indication message, the modem 20 discards the normal response data and skips waking up the application processor, where the normal response data is used for indicating that the application server has already received the online indication message.

Based on any one of the foregoing terminal embodiments, in another embodiment of the terminal provided by the embodiment of the present invention, after receiving the heartbeat configuration information corresponding to the application and sent by the application processor, the modem 20 receives deletion instruction information, which is sent by the application processor, for the heartbeat configuration information corresponding to the application, where the deletion instruction information is used for instructing deletion of the heartbeat configuration information of the application specified by the application processor. The modem 20 deletes, according to the received deletion instruction information, the heartbeat configuration information of the application specified by the application processor.

A person of ordinary skill in the art may understand that all or a part of the steps of the methods in the embodiments may be implemented by a program instructing relevant hardware. The program may be stored in a computer readable storage medium. The storage medium may include a ROM, a RAM, a magnetic disk, or an optical disc.

The method for acting as a service agent, modem, and terminal provided by the embodiments of the present invention are described above in detail. Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A method for acting as a service agent, the method comprising:
receiving from an application processor, by a modem, heartbeat configuration information corresponding to an application, wherein the application processor is in a sleep state after sending the heartbeat configuration information corresponding to the application, wherein the heartbeat configuration information comprises an initial heartbeat interval of the application, wherein the application comprises at least two applications;

when an initial heartbeat interval of one application of the at least two applications is not less than the preset time threshold, adjusting the initial heartbeat interval of the one application of the at least two applications; and when the initial heartbeat interval of one application of the at least two applications is not less than the preset time threshold, establishing, by the modem according to the adjusted initial heartbeat interval, a heartbeat connection with an application server corresponding to the one application of the at least two applications, wherein the application processor is not woken up when the application has no updated content.

2. The method according to claim 1, further comprising:
comparing, by the modem, initial heartbeat intervals of the at least two applications with the preset time threshold.

3. The method according to claim 1, wherein when the initial heartbeat interval of one application of the at least two applications is less than the preset time threshold, establishing, by the modem according to the initial heartbeat interval, a heartbeat connection with an application server corresponding to the one application of the at least two applications, wherein the application processor is not woken up when the application has no updated content.

4. The method according to claim 1, wherein the adjusting the initial heartbeat interval of the one application of the at least two applications comprises:
determining a minimum initial heartbeat interval according to the initial heartbeat intervals of the at least two applications;
dividing the initial heartbeat interval, which is not less than the preset time threshold, of the one application of the at least two applications by the minimum initial heartbeat interval and rounding up or down a quotient to obtain a whole number, and multiplying the whole number by the minimum initial heartbeat interval, to determine an adjusted heartbeat interval for the one application of the at least two applications; and
adjusting the initial heartbeat interval of the one application of the at least two applications according to the adjusted heartbeat interval for the one application of the at least two applications.

5. The method according to claim 1, wherein the modem communicates with the application processor by using a shared memory (SM) or an attention (AT) instruction channel.

6. The method according to claim 1, wherein the establishing the heartbeat connection comprises:
sending an online indication message to the application server corresponding to the application.

7. The method according to claim 6, wherein after the sending, the method further comprises:
receiving, by the modem, data sent by the application server;
analyzing, by the modem, whether the data sent by the application server is application data according to the received data sent by the application server;
executing at least one or more of the following steps according to an analysis result:
when it is learned, by analyzing, that the data is application data normally pushed by the application server, waking up the application processor and sending the application data to the application processor;
when it is learned, by analyzing, that the data is abnormal response data fed back by the application server with regard to the online indication message, waking up the application processor and sending the abnormal response data to the application processor, wherein the abnormal response data is interaction data fed back by the application server to the application processor; and
when it is learned, by analyzing, that the data is normal response data fed back by the application server with regard to the online indication message, discarding the normal response data and skipping waking up the application processor, wherein the normal response data is used for indicating that the application server has already received the online indication message.

8. The method according to claim 1, wherein after the receiving, by a modem, heartbeat configuration information corresponding to an application and sent by an application processor, the method further comprises:
receiving, by the modem, deletion instruction information, which is sent by the application processor, for the heartbeat configuration information corresponding to the application, wherein the deletion instruction information is used for instructing deletion of heartbeat configuration information of an application specified by the application processor; and
deleting, by the modem according to the received deletion instruction information, the heartbeat configuration information of the application specified by the application processor.

9. A modem comprising:
an input device, an output device, a processor, and a memory storing program instructions to be executed in the processor,
wherein the input device is configured to receive heartbeat configuration information corresponding to an application from an application processor, wherein the application processor is in a sleep state after sending the heartbeat configuration information corresponding to the application, wherein the heartbeat configuration information comprises an initial heartbeat interval of the application, wherein the application comprises at least two applications; and
wherein the program instructions are configured to cause the processor to
when an initial heartbeat interval of one application of the at least two applications is not less than a preset time threshold, adjust the initial heartbeat interval of the one application of the at least two applications, and
establish, according to the adjusted initial heartbeat interval, a heartbeat connection with an application server corresponding to the one application of the at least two applications, wherein the application processor is not woken up when the application has no updated content.

10. The modem according to claim 9, wherein the program instructions are further configured to cause the processor to:
compare initial heartbeat intervals of the at least two applications with the preset time threshold.

11. The modem according to claim 9, wherein:
the program instructions are further configured to cause the processor to:
determine a minimum initial heartbeat interval according to the initial heartbeat intervals of the at least two applications;
divide the initial heartbeat interval, which is not less than the preset time threshold, of the one application of the at least two applications by the minimum initial heartbeat interval and rounding up or down a quotient to obtain a whole number;

multiply the whole number by the minimum initial heartbeat interval to determine an adjusted heartbeat interval for the one application of the at least two applications; and adjust the initial heartbeat interval of the one application of the at least two applications according to the adjusted heartbeat interval for the one application of the at least two applications.

12. The modem according to claim 9, wherein:

the processor is configured to trigger, according to the heartbeat configuration information corresponding to the application, sending of an online indication message to the application server corresponding to the application; and the output device is configured to send the online indication message to the application server corresponding to the application, so as to establish the heartbeat connection with the application server corresponding to the application.

13. The modem according to claim 12, wherein:

the input device is further configured to receive data sent by the application server;

the program instructions are further configured to cause the processor to analyze whether the data sent by the application server is application data according to the received data sent by the application server; and the processor and the output device are further configured to execute at least one or more of the following steps according to an analysis result:

when the processor learns, by analyzing, that the data is application data normally pushed by the application server, the processor wakes up the application processor, and the output device sends the application data to the application processor;

when the processor learns, by analyzing, that the data is abnormal response data fed back by the application server with regard to the online indication message, the processor wakes up the application processor, and the output device sends the abnormal response data to the application processor, wherein the abnormal response data is interaction data fed back by the application server to the application processor; and when the processor learns, by analyzing, that the data is normal response data fed back by the application server with regard to the online indication message, the processor discards the normal response data and skips waking up the application processor, wherein the normal response data is used for indicating that the application server has already received the online indication message.

14. The modem according to claim 9, wherein:

the input device is further configured to receive deletion instruction information, which is sent by the application processor, for the heartbeat configuration information corresponding to the application, wherein the deletion instruction information is used for instructing deletion of heartbeat configuration information of an application specified by the application processor; and the program instructions are further configured to cause the processor to delete, according to the received deletion instruction information, the heartbeat configuration information of the application specified by the application processor.

15. The modem according to claim 9, wherein the program instructions are further configured to cause the processor to:

not adjust an initial heartbeat interval corresponding to an application of the at least two applications that has an initial heartbeat interval less than the preset time threshold, and establish according to the heartbeat configuration information corresponding to the application interval, a heartbeat connection with an application server corresponding to the application of the at least two applications that has an initial heartbeat interval less than the preset time threshold.

16. A terminal comprising a modem and an application processor, wherein:

the application processor is configured to send heartbeat configuration information corresponding to an application to the modem, and is in a sleep state after sending the heartbeat configuration information corresponding to the application, and the application processor is not woken up when the application has no updated content; and the modem is configured to receive the heartbeat configuration information corresponding to the application sent by the application processor, wherein the application comprises at least two applications having corresponding initial heartbeat period, when an initial heartbeat period of one application of the at least two applications is not less than a preset time threshold, adjust the initial heartbeat period of the one application of the at least two applications, and establish, according to the adjusted initial heartbeat period, a heartbeat connection with an application server corresponding to the one application of the at least two applications.

17. The terminal according to claim 16, wherein the modem is further configured to:

compare initial heartbeat periods of the at least two applications with the preset time threshold.

18. The terminal according to claim 16, wherein the modem is further configured to:

determine a minimum initial heartbeat period according to the initial heartbeat periods of the at least two applications;

divide the initial heartbeat period, which is not less than the preset time threshold, of the one application of the at least two applications by the minimum initial heartbeat period to obtain a whole number;

multiply the whole number by the minimum initial heartbeat period to determine an adjusted heartbeat period for the one application of the at least two applications; and adjust the initial heartbeat period of the one application of the at least two applications according to the adjusted heartbeat period for the one application of the at least two applications.

19. The terminal according to claim 16, wherein:

the modem is further configured to establish, according to the heartbeat configuration information corresponding to the application, the heartbeat connection with the application server corresponding to the application by sending an online indication message to the application server corresponding to the application.

20. The terminal according to claim 19, wherein the modem is further configured to:

after sending the online indication message to the application server corresponding to the application, receive data sent by the application server, and analyze whether the data sent by the application server is application data according to the received data sent by the application server; and execute at least one or more of the following steps according to an analysis result:

when it is learned, by analyzing, that the data is application data normally pushed by the application server, wake up the application processor and send the application data to the application processor;

when it is learned, by analyzing, that the data is abnormal response data fed back by the application server with regard to the online indication message, wake up the application processor and send the abnormal response data to the application processor, wherein the abnormal response data is interaction data fed back by the application server to the application processor; and when it is learned, by analyzing, that the data is normal response data fed back by the application server with regard to the online indication message, discard the normal response data and skip waking up the application processor, wherein the normal response data is used for indicating that the application server has already received the online indication message.

21. The terminal according to claim 16, wherein the modem is further configured to:

not adjust an initial heartbeat interval corresponding to an application of the at least two applications that has an initial heartbeat interval less than the preset time threshold, and establish according to the heartbeat configuration information corresponding to the application interval, a heartbeat connection with an application server corresponding to the application of the at least two applications that has an initial heartbeat interval less than the preset time threshold.

* * * * *